US009665103B1

(12) United States Patent
Bonawitz et al.

(10) Patent No.: US 9,665,103 B1
(45) Date of Patent: May 30, 2017

(54) EFFICIENT AEROSTAT NAVIGATION BY MOVING BETWEEN ATMOSPHERIC LAYERS

(71) Applicant: X Development LLC, Mountain View, CA (US)

(72) Inventors: Keith Allen Bonawitz, Watchung, NJ (US); Johan Mathe, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/963,651

(22) Filed: Dec. 9, 2015

(51) Int. Cl.
G05D 1/04 (2006.01)
B64B 1/44 (2006.01)
G01P 5/00 (2006.01)

(52) U.S. Cl.
CPC ............... *G05D 1/042* (2013.01); *B64B 1/44* (2013.01); *G01P 5/00* (2013.01)

(58) Field of Classification Search
CPC ... G05D 1/042; B64B 1/44; G01P 5/00; F05B 2240/921
See application file for complete search history.

(56) References Cited

U.S. PATENT DOCUMENTS

| | | | |
|---|---|---|---|
| 5,470,032 A | 11/1995 | Williams, Jr. et al. | |
| 6,402,090 B1 | 6/2002 | Aaron | |
| 7,469,857 B2 | 12/2008 | Voss | |
| 8,091,826 B2 | 1/2012 | Voorhees | |
| 8,862,403 B1 | 10/2014 | Piponi et al. | |
| 2006/0000945 A1* | 1/2006 | Voss | B64B 1/60 244/97 |
| 2012/0126052 A1 | 5/2012 | Murakami | |
| 2013/0175391 A1 | 7/2013 | DeVaul et al. | |
| 2014/0014770 A1 | 1/2014 | Teller et al. | |
| 2015/0309157 A1 | 10/2015 | Knoblach et al. | |

FOREIGN PATENT DOCUMENTS

JP 2004009832 A 1/2004

OTHER PUBLICATIONS

International Search Report for corresponding international application No. PCT/US16/064211 mailed Mar. 20, 2017.
Written Opinion for corresponding international application No. PCT/US16/064211 mailed Mar. 20, 2017.

* cited by examiner

*Primary Examiner* — Yuen Wong
(74) *Attorney, Agent, or Firm* — McDonnell Boehnen Hulbert & Berghoff LLP

(57) ABSTRACT

An example computer-implemented method involves determining that an aerostat is located within a first atmospheric layer. A first wind-velocity measure is indicative of wind velocity in the first atmospheric layer. The method also involves determining an altitude of an atmospheric layer boundary between the first atmospheric layer and a second atmospheric layer. A second wind-velocity measure is indicative of wind velocity in the second atmospheric layer, and the second wind-velocity measure differs from the first wind-velocity measure by at least a threshold amount. The method further involves determining a desired location for the aerostat, and during at least a portion of a flight towards the desired location, causing the aerostat to traverse back and forth across the atmospheric layer boundary while remaining within a predetermined vertical distance from the atmospheric layer boundary in order to achieve a desired horizontal trajectory.

15 Claims, 8 Drawing Sheets

EFFICIENT AEROSTAT NAVIGATION BY MOVING BETWEEN ATMOSPHERIC LAYERS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Embodiments described herein may relate to navigating an aerostat in the atmosphere, and in particular, to causing an aerostat to attempt to remain near an atmospheric layer boundary as the aerostat navigates to a desired location. In some examples, operating near an atmospheric layer boundary may allow the aerostat to make a small altitude change in order to effect a significant change in velocity by crossing the atmospheric layer boundary. Furthermore, the systems and methods described herein may involve causing an aerostat to traverse back and forth across an atmospheric layer boundary during at least a portion of a flight towards a desired location. With this approach, the aerostat can achieve an arbitrary combination of the velocity vectors from the winds on either side of the boundary.

In one aspect, an example computer-implemented method involves determining that an aerostat is located within a first atmospheric layer. A first wind-velocity measure is indicative of wind velocity in the first atmospheric layer. The method also involves determining an altitude of an atmospheric layer boundary between the first atmospheric layer and a second atmospheric layer. A second wind-velocity measure is indicative of wind velocity in the second atmospheric layer, and the second wind-velocity measure differs from the first wind-velocity measure by at least a threshold amount. The method further involves determining a desired location for the aerostat, and during at least a portion of a flight towards the desired location, causing the aerostat to traverse back and forth across the atmospheric layer boundary while remaining within a predetermined vertical distance from the atmospheric layer boundary in order to achieve a desired horizontal trajectory.

In another aspect, a computing device including a processor and a computer-readable medium is provided. The computer-readable medium has stored therein instructions that are executable to cause the computing device to perform functions. The functions include determining that an aerostat is located within a first atmospheric layer. A first wind-velocity measure is indicative of wind velocity in the first atmospheric layer. The functions also include determining an altitude of an atmospheric layer boundary between the first atmospheric layer and a second atmospheric layer. A second wind-velocity measure is indicative of wind velocity in the second atmospheric layer, and the second wind-velocity measure differs from the first wind-velocity measure by at least a threshold amount. Further, the functions include determining a desired location for the aerostat, and during at least a portion of a flight towards the desired location, causing the aerostat to traverse back and forth across the atmospheric layer boundary in order to achieve a desired horizontal trajectory.

In a further aspect, an example computer-implemented method involves identifying a first atmospheric layer in which a measure of wind velocity differs from a corresponding measure of wind velocity in an adjacent atmospheric layer by at least a threshold amount. The method also involves determining an altitude of an atmospheric layer boundary between the first atmospheric layer and the adjacent atmospheric layer. Further, the method involves determining a desired horizontal trajectory for an aerostat. The aerostat is located within the first atmospheric layer. And the method involves based at least on the desired horizontal trajectory for the aerostat, causing the aerostat to navigate to an altitude that is within a predetermined vertical distance from the atmospheric layer boundary to decrease an altitude-change value of the aerostat. The altitude-change value is indicative of a minimum altitude change required by the aerostat in order to change its horizontal velocity by a predetermined amount.

These as well as other aspects, advantages, and alternatives, will become apparent to those of ordinary skill in the art by reading the following detailed description, with reference where appropriate to the accompanying figures.

DETAILED DESCRIPTION

Figure 1:
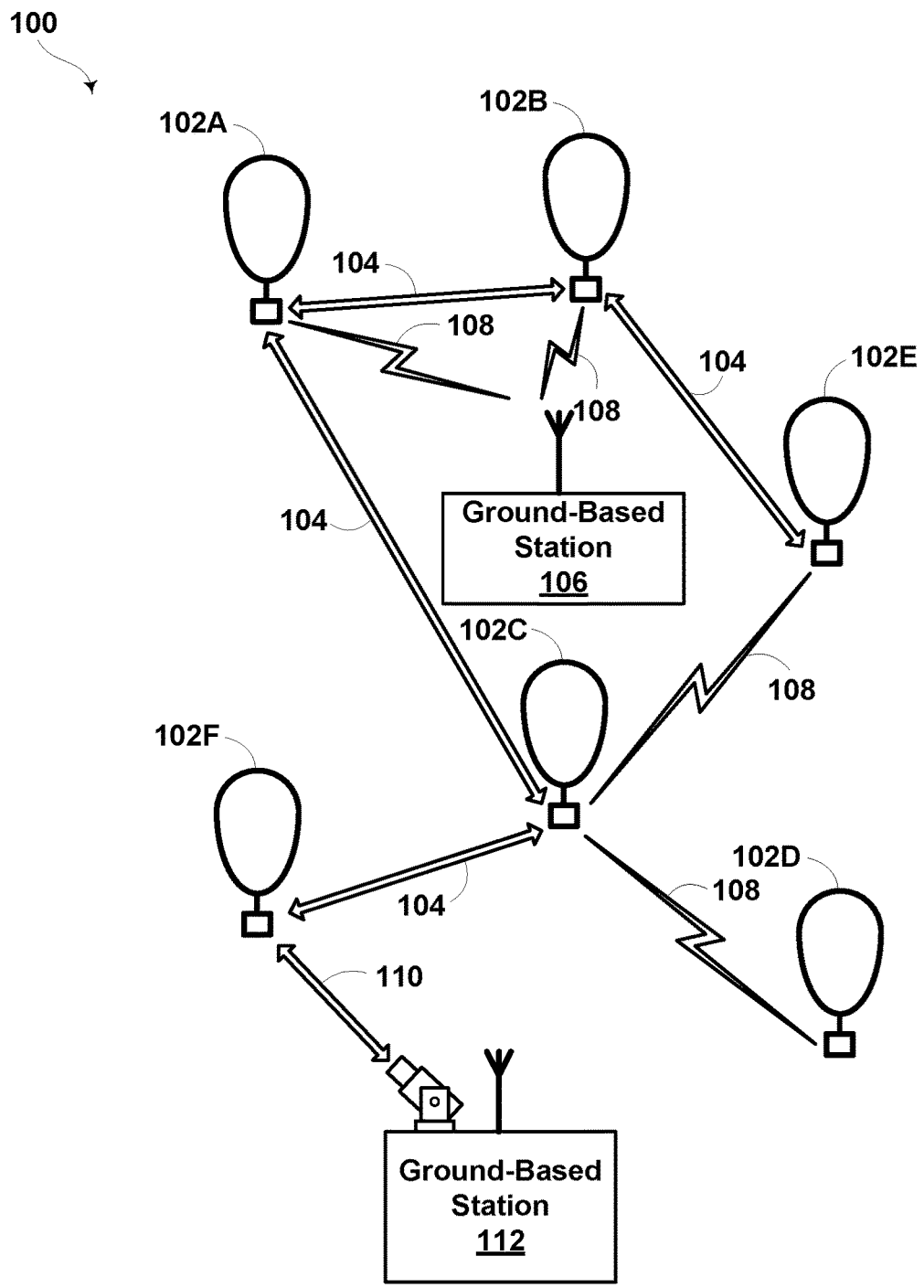
FIG. 1 is a block diagram illustrating an example balloon network.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems are described with respect to a balloon or balloons in a fleet of balloons arranged as a data network. However, methods and systems herein may be applicable to balloons that are not arranged as a data network as well. Similarly, the methods and systems may be applicable to other types of aerostats, such as airships, for instance. Thus, the examples described are not meant to be limiting.

I. Overview

Within the atmosphere, and more particularly, within the stratosphere, wind speeds and directions vary with altitude. Accordingly, one technique for navigating an aerostat within the stratosphere involves causing the aerostat to adjust its vertical position (i.e., altitude) in order to change its horizontal position. For example, taking advantage of the altitudinally-varying wind conditions in the stratosphere, the aerostat may control its altitude to find winds that carry it in a desired horizontal direction (e.g., latitudinally and/or longitudinally). Using such altitude changes to cause horizontal movement, may consume less power, on average, than using a thruster or fan to achieve the same horizontal movement. In some examples, each balloon may be configured to change its horizontal position using propellers or other mechanisms to generate horizontal thrust in addition to adjusting its horizontal position by adjusting its vertical position.

An aerostat may still need to consume power to make altitudinal changes. For instance, decreasing altitude may involve pumping atmospheric gas into a bladder within an envelope. Similarly, increasing altitude may involve releasing atmospheric gas back into the surrounding atmosphere (although increasing altitude in this manner may consume less energy than pumping atmospheric gas to decrease altitude). The aerostat, however, may have a limited amount of power available. Accordingly, systems and methods for navigating an aerostat in a way that reduces power consumption are provided.

As noted above, the wind patterns in the atmosphere are often stratified. More specifically, the stratosphere can include a number of atmospheric layers, which may be 1-3 kilometers thick, for example. The wind velocity will typically change slowly as the aerostat traverses vertically through a layer in the stratosphere. At boundaries between layers, however, there may be abrupt changes in wind velocity. As an example, a 100-meter altitude change that moves an aerostat across a layer boundary may result in an order of magnitude greater wind velocity change than the aerostat would have accomplished by traversing through the interior of an entire layer.

Given these characteristics of the stratosphere, in an illustrative embodiment, an aerostat may attempt to remain near a stratospheric layer boundary as it navigates to a desired horizontal location. Flying near a stratospheric layer boundary may allow the aerostat to make a small altitude change (spending a small amount of power) in order to effect a significant change in velocity. Thus, an aerostat may navigate to a location that is near the boundary so that the aerostat is ready to make a small altitude change (e.g., by crossing the boundary) to change its velocity by a significant amount if needed. If the aerostat is flying near a boundary and needs to change its velocity by crossing the boundary to catch different winds, the aerostat may use less energy to change its altitude and cross the boundary, than it would from a location in the interior of the layer (and further from the boundary). In practice, the proximity of the aerostat may be one of multiple factors that are considered and weighed against each other when determining a flight plan for the aerostat.

Furthermore, in some instances, the aerostat can "tack" (similar to the manner in which sailboats tack) back and forth across the boundary relatively inexpensively (in terms of power consumption). For instance, during at least a portion of a flight towards a desired location, when the aerostat is above a boundary, the aerostat can lower its altitude, causing the aerostat to traverse the boundary and change its velocity by catching the winds below the boundary. Subsequently, the aerostat can then raise its altitude, causing the aerostat to traverse back across the boundary and change its velocity by catching the winds above the boundary.

In addition, by controlling the amount of time spent on either side of the boundary, the aerostat can also achieve an arbitrary combination of the velocity vectors from the winds on either side of the boundary. In one example, the direction of the winds above and below the boundary may be relatively similar, but the speed of the winds above and below the boundary may be greater than the winds below the boundary. In such a scenario, a controller may cause the aerostat to spend a greater amount of time above the boundary than below the boundary to increase the speed of the aerostat and cause the aerostat to reach its desired location faster. Likewise, the controller may cause the aerostat to spend greater amount of time below the boundary than above the boundary to decrease the speed of the aerostat.

In another example, the speed of the winds above and below the boundary may be relatively similar, but the direction of the winds above and below the boundary may differ. With this scenario, a controller may control an amount of time spent above and below the boundary to cause the aerostat to achieve an overall horizontal trajectory. As one of ordinary skill in the art will appreciate, in theory, any horizontal trajectory that is a combination of the wind directions above and below the boundary is possible.

In a further aspect, a controller may also cause the aerostat to transition between high-frequency tacking (e.g., crossing the boundary frequently) and low-frequency tacking (e.g., crossing the boundary less frequently) depending on the desired goal. While performing low-frequency tacking, the aerostat may experience larger deviations from a desired horizontal trajectory than deviations from the desired horizontal trajectory that the aerostat experiences while performing high-frequency tacking. For example, if winds above a boundary generally flow in a Northern direction and winds below a boundary generally flow in an Eastern direction, the aerostat can fly in an overall Northeastern direction by catching the Northern winds above the boundary during one or more portions of a flight and catching the Eastern winds below the boundary during other portions of the flight. With low-frequency tacking, the aerostat might first fly in a Northern direction during a first half of a flight before switching to flying in an Eastern direction during a second half of the flight to achieve an overall trajectory in the Northeastern direction. In other words, during the halfway point of the flight, the aerostat may have significantly deviated from a hypothetical straight path in the Northeastern direction. On the other hand, with a higher frequency tacking approach, the aerostat might perform more boundary crossings, such that the aerostat is not deviating as far away from the hypothetical straight path in the Northeastern direction.

Accordingly, the aerostat may perform high-frequency tacking in order to achieve precision navigation to a near-term destination, at the cost of greater power consumption. On the other hand, if the objective is further in the future, the aerostat can perform low-frequency tacking, resulting in lower power consumption at the cost of longer deviations from the desired trajectory. In one approach, an aerostat may start with a low-frequency tacking strategy and gradually shift to a high-frequency tacking strategy as the aerostat approaches its destination.

In some instances, aerostats can exchange information about observations of stratospheric layer boundaries with each other. For instance, if a first aerostat flying in a first region observes a stratospheric layer boundary at a first altitude, the first aerostat may inform a neighboring aerostat of the location (e.g., altitude) of the stratospheric layer boundary. The neighboring aerostat may then use the received information, and search for a layer boundary near that location. Similarly, in some instances, aerostats can exchange information about wind velocities observed near any identified layer boundaries.

It should be understood that traveling or attempting to travel "to", "towards", or "in the direction of" a desired horizontal trajectory as used herein could include traveling in a direction that varies by some amount (e.g., 5 or 15 degrees) from the precise horizontal trajectory. In a similar manner, it should be understood that traveling or attempting to travel "to", "towards", or "in the direction of" a desired location could include traveling to a location that varies by some amount (e.g., 10 or 100 meters) from the precise location.

II. Illustrative Aerostat Network

Referring now to the Figures, FIG. 1 is a block diagram illustrating an example balloon network 100. As shown, the balloon network 100 includes balloons 102A to 102F, which are configured to communicate with one another via free-space optical links 104 and/or RF links 108. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has a wide range of wind speeds. For instance, between 17 km and 20 km altitude above the surface, the average wind speed may be between about 30 mph to about 35 mph, while the max wind speed may be up to 200 mph. As another example, at about 26 km altitude above the surface, the average wind speed may be between about 60 mph to about 65 mph, while the max wind speed may exceed 300 mph.

More specifically, in a high-altitude-balloon network, balloons 102A to 102F may generally be configured to operate at altitudes between 18 km and 25 km (although other altitudes are possible). At such altitudes, the winds may vary with latitude and by season, and the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be more dense over land than over large bodies of water. Many other examples of non-uniform topologies are possible.

III. Illustrative Control System

Figure 2:
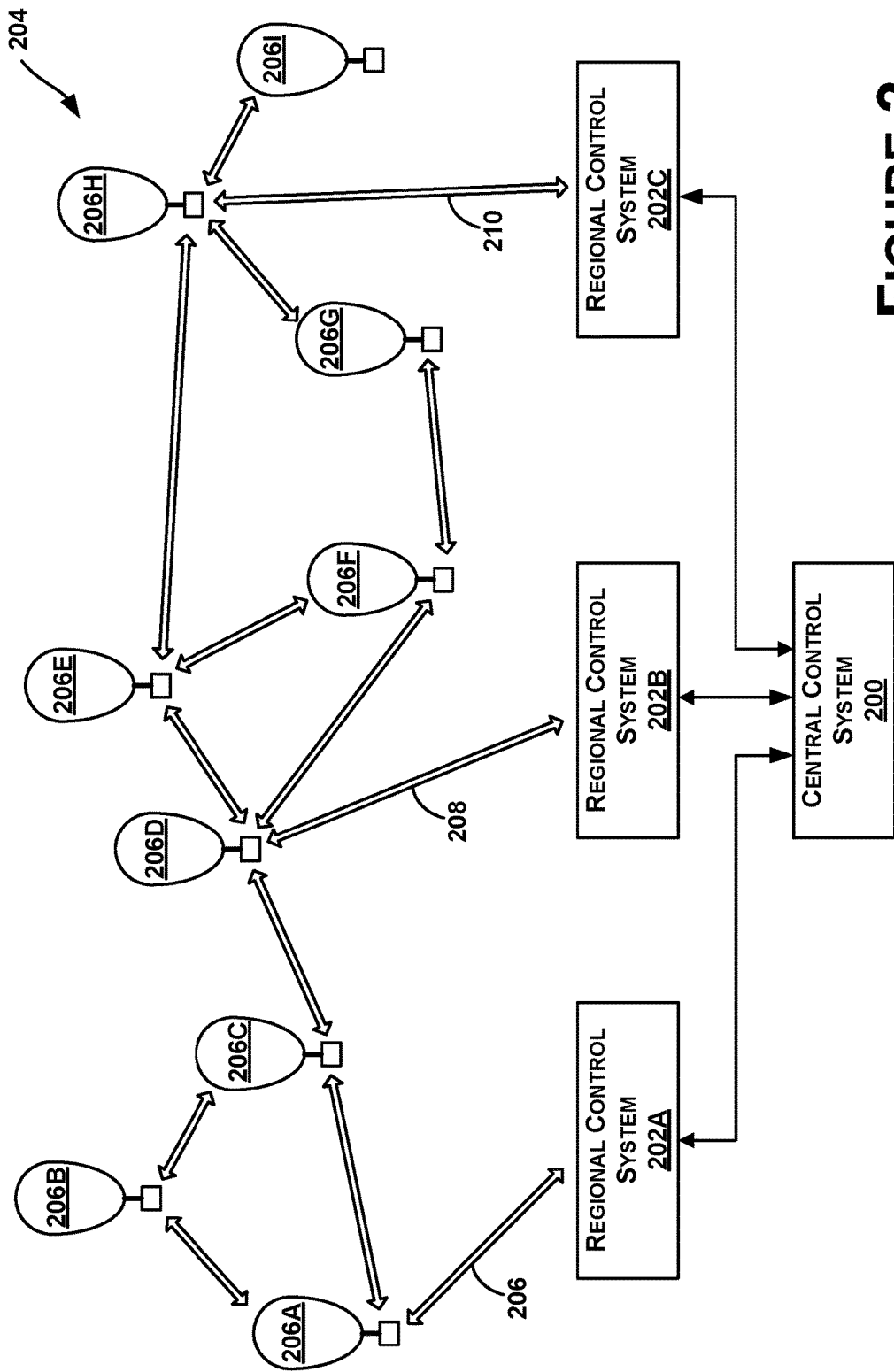
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

IV. Illustrative Aerostat

Figure 3:
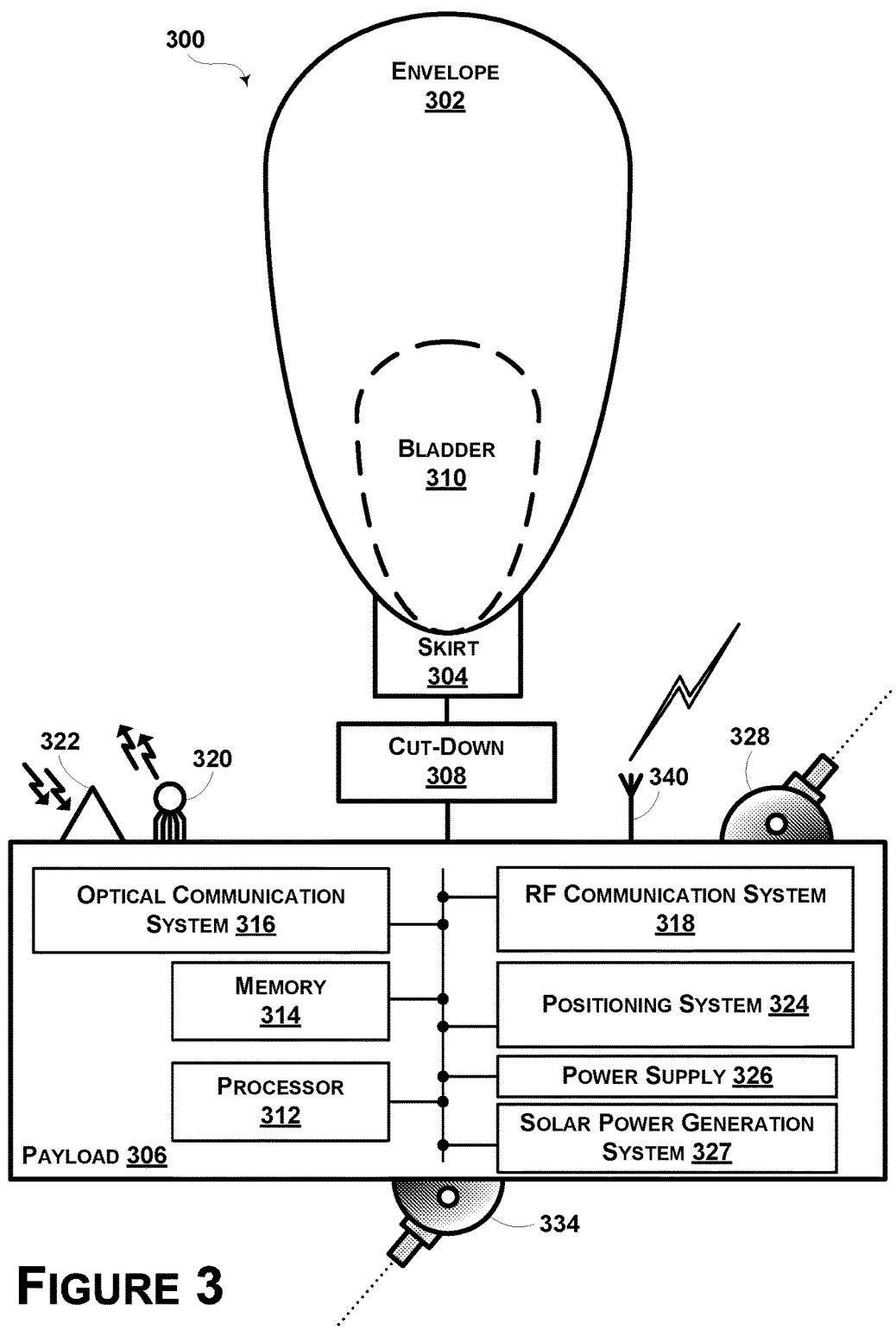
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 306.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

V. Conceptual Illustrations

In some examples, when managing a fleet of autonomous balloons, a fleet administrator or computer may determine different flight paths for respective balloons of the fleet in order to satisfy coverage requirements or for various other purposes. For instance, a controller may determine that a first balloon should travel from a first starting location to a first target location during a particular time period and then travel to another target location during a subsequent time period, a second balloon should travel from a second starting location to a second target location during the particular time period and then travel to another target location during a subsequent time period, and so forth. In one particular example, in order for a fleet of balloons to satisfy coverage requirements for different geographic regions, a fleet plan that stages balloons in particular places ahead of deadlines such that the balloons will be able to arrive at a desired location on time may be required. Therefore, to control the fleet of balloons, a simultaneous plan of trajectory for many balloons at many different starting locations may be determined, and each balloon may take a different path.

As noted above, the systems and methods disclosed herein provide for navigating an aerostat in a way that reduces power consumption. For example, an aerostat may attempt to remain near a stratospheric layer boundary as it navigates to a desired horizontal location. Flying near a stratospheric layer boundary may allow the aerostat to make a small altitude change (spending a small amount of power) in order to effect a significant change in velocity. Thus, in accordance with the disclosure, during at least a portion of a flight towards a desired location, an aerostat may navigate to a location that is near the boundary so that the aerostat is ready to make a small altitude change (e.g., by crossing the boundary) to change its velocity by a significant amount if needed. Furthermore, in some instances, the aerostat can tack back and forth across the boundary relatively inexpensively (in terms of power consumption) during at least a portion of the flight.

Figure 4:
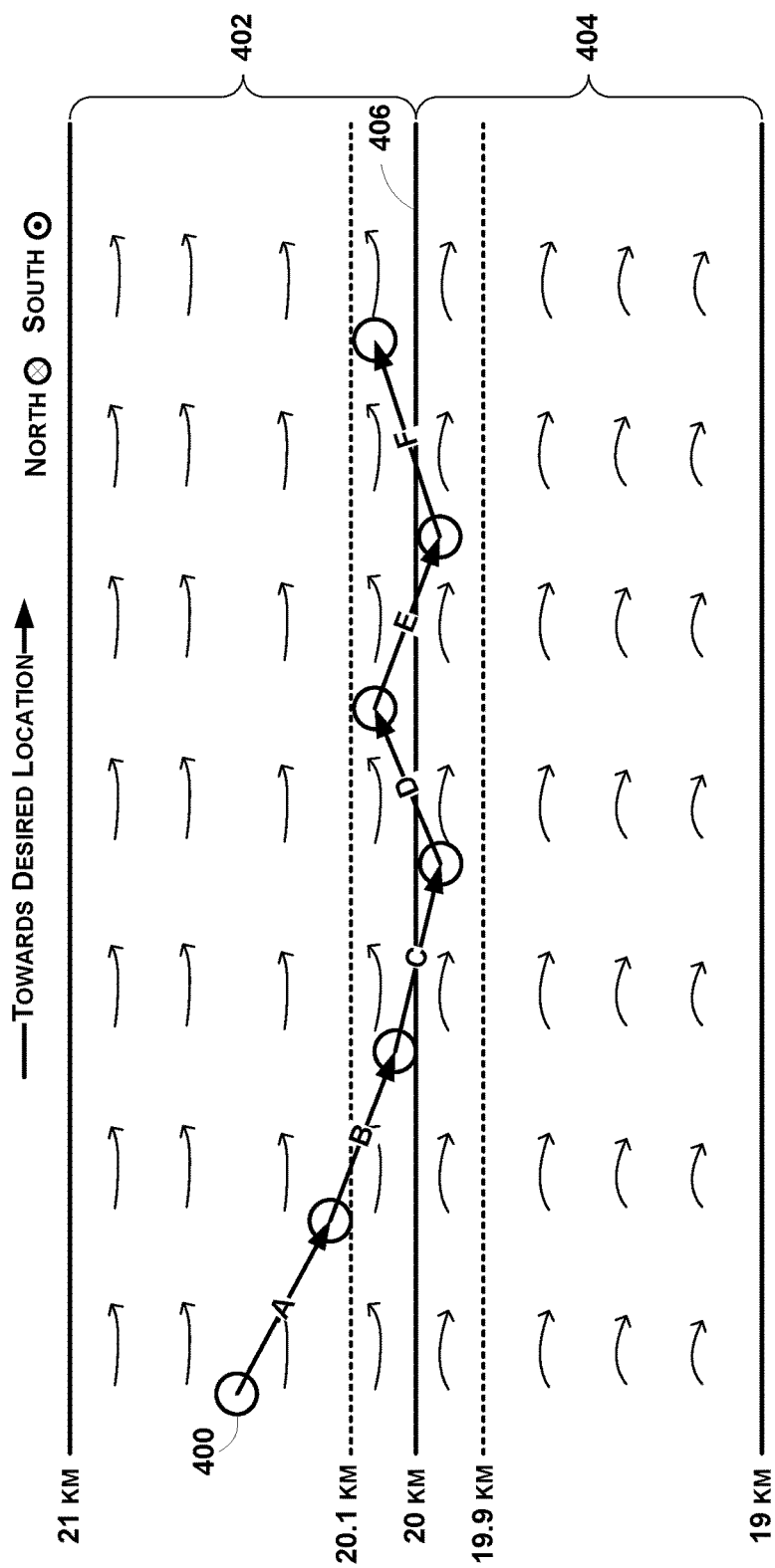
FIG. 4 is a conceptual illustration of an example flight path of an aerostat, according to an example embodiment.
Figure 4:
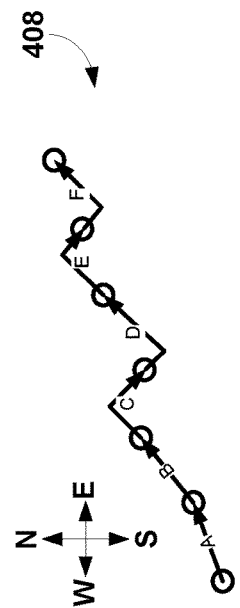

FIG. 4 is a conceptual illustration of an example flight path of an aerostat, according to an example embodiment. As shown in FIG. 4, an aerostat 400 may initially be located within a first atmospheric layer 402 spanning from an altitude of 20 km to 21 km. For instance, the aerostat 400 may be located within the first atmospheric layer during a flight towards a desired location. In FIG. 4, the directions of the wind vectors represent wind directions and the magnitudes of the wind vectors represent wind speeds. Thus, within the first atmospheric layer 400, winds may be generally flowing in a Northeastern direction (partially into the plane of the page in FIG. 4). Further, the winds may gradually decrease in velocity as the altitude increases. A first wind-velocity measure may be indicative of wind velocity in the first atmospheric layer 402.

Furthermore, there may be a second atmospheric layer 404 located below the first atmospheric layer 402, and an atmospheric layer boundary 406 separating the first atmospheric layer 402 and the second atmospheric layer 404. Within the second atmospheric layer 404, winds may be generally flowing in a Southeastern direction (partially out of the plane of the page in FIG. 4). Furthermore, the winds may gradually decrease in velocity as the altitude decreases. A second wind-velocity measure may be indicative of the wind velocity in the second atmospheric layer 404. The second wind-velocity measure may differ from the first wind-velocity measure by at least a threshold amount. The threshold amount may be a threshold difference in direction (e.g., 10 degrees, 20 degrees, etc.) and/or threshold speed (e.g., 10 mph, 50 mph, etc.).

In practice, a controller, such as a controller of the aerostat 400 or a ground-based control station may determine an altitude of the atmospheric layer boundary 406. In one example, the aerostat 400 may search vertically for the atmospheric layer boundary 406 (not shown). For instance, the aerostat 400 may increase and decrease its altitude to evaluate wind conditions within a predetermined evaluation range (e.g., 1-3 km) above and below its current altitude. Alternatively, rather than changing its altitude to search for the atmospheric layer boundary 406, the aerostat may receive wind data from another aerostat that is nearby the aerostat or has recently traveled through the location in which the aerostat is located.

After determining the wind conditions at various altitudes, a controller may then analyze the wind velocities and identify one or more atmospheric layers punctuated by abrupt changes in velocity. For example, the controller may attempt to divide a vertical range into two or more atmospheric layers in which the velocity of the wind changes relatively slowly within the atmospheric layers but changes abruptly when crossing between the layers.

In another example, determining the altitude of the atmospheric layer boundary 406 may involve accessing a database storing data that maps geographic locations to atmospheric layer boundaries. For instance, a controller may determine a geographic location (e.g., latitude and longitude) of the aerostat, and then look up the atmospheric layer boundaries for that geographic location in the database. Alternatively, the controller may simply receive an indication of the altitude of the atmospheric layer boundary 406 from another device (e.g., a ground-based control system or a neighboring aerostat).

As further shown in FIG. 4, during at least a portion of a flight towards the desired location, the aerostat may adjust its altitude in order to decrease an altitude-change value of the aerostat. The altitude-change value may be indicative of a minimum altitude change required by the aerostat in order to change its horizontal velocity by a predetermined amount (e.g., 10%, 20%, etc.). With respect to FIG. 4, when the aerostat 400 is located at its initial position (the leftmost position in FIG. 4), the altitude-change value may be relatively high, since the winds immediately above and below the aerostat 400 are relatively similar to the winds at the aerostat's current altitude. On the other hand, near the atmospheric boundary layer 406, the altitude-change value may be lower, since the aerostat can significantly change its horizontal velocity by crossing the atmospheric layer boundary 406.

Accordingly, based at least on the altitude-change value near the atmospheric layer boundary 406 being less than the altitude-change value at the aerostat's current position, the aerostat 400 may decrease its altitude. This decrease in altitude is indicated by arrows A and B in FIG. 4.

Alternatively, a controller may determine that the initial altitude of the aerostat is outside of a predetermined vertical distance from the atmospheric layer boundary 406 (e.g., 100 meters). And responsive to determining that the initial altitude of the aerostat 400 is outside the predetermined vertical distance, the controller may cause the aerostat to move to an altitude within the predetermined vertical distance from the atmospheric layer boundary 406.

As also noted above, another advantage of being located near the atmospheric layer boundary 406 rather than within an interior of the atmospheric layer 402 is that the aerostat can also achieve a desired horizontal trajectory by tacking back and forth across the atmospheric layer boundary relatively inexpensively (in terms of power consumption). As indicated by arrows C, D, E, and F in FIG. 4, the aerostat 400 can transition from positions above and below the atmospheric layer boundary 406 during different portions of its flight towards the desired location. In practice, after adjusting its altitude to cross the atmospheric layer boundary 406, the aerostat might not increase or decrease its altitude for duration of time, such that the aerostat remains at a constant altitude or drifts up or down without consuming power. Thus, the arrows A, B, C, D, E, and F do not represent the actual altitude of the aerostat 400 over time and are merely meant to illustrate boundary crossings.

The diagram 408 illustrates the resulting horizontal trajectory of the aerostat 400 due to the tacking. In practice, a controller may adjust the horizontal trajectory of the aerostat by controlling the amount of time spent on either side of the atmospheric layer boundary 406. In one example, the controller may determine, based on the initial location of the aerostat and the desired location of the aerostat, a desired horizontal trajectory for the aerostat. And while the aerostat is traversing back and forth across the atmospheric layer boundary 406, the controller may control a respective amount of time spent on each side of the atmospheric layer boundary 406 in order to achieve the desired horizontal trajectory.

By way of example, a controller may determine the wind velocities above and below the atmospheric layer boundary 406, and based on the wind velocities, cause the aerostat to operate within the first atmospheric layer 402 for a first percentage of a time period and operate within the second atmospheric layer for a second percentage of the time period. If the first percentage and the second percentage are both equal, the resulting trajectory may be an average of the wind velocity in the first atmospheric layer 402 and the wind velocity in the second atmospheric layer 404. On the other hand, if the first percentage is greater than the second percentage, the resulting trajectory may be skewed towards the wind velocity in the atmospheric layer 402. Whereas, if the second percentage is greater than the first percentage, the resulting trajectory may be skewed towards the wind velocity in the atmospheric layer 404.

In one implementation, the aerostat may be configured to remain with a predetermined vertical distance from the atmospheric layer boundary 406, such as 100 meters as indicated by the dotted lines in FIG. 4. With this arrangement, the controller may consider the wind velocities within the predetermined vertical distance from the atmospheric layer boundary 406 when determining the amount of time that the aerostat should spend on each side of the atmospheric layer boundary 406.

Figure 5:
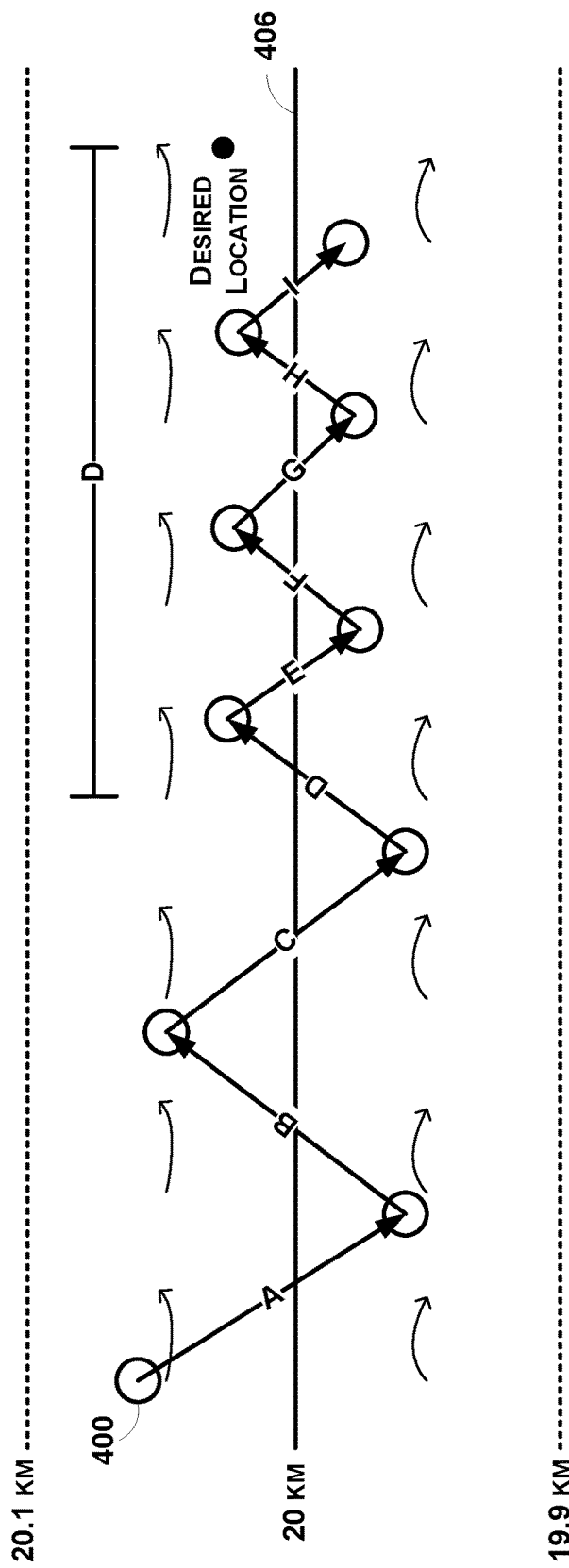
FIG. 5 is a conceptual illustration of another example flight path of an aerostat, according to an example embodiment.

FIG. 5 is a conceptual illustration of another example flight path of an aerostat, according to an example embodiment. As noted above, in some instances, a controller may control the frequency with which the aerostat 400 tacks across the atmospheric layer boundary 406. The frequency may be a number of atmospheric layer boundary crossings per unit time (e.g., per minute, per hour, etc.). In one approach, the aerostat may start with a low-frequency tacking strategy and gradually shift to a high-frequency tacking strategy as the aerostat approaches its destination. As shown in FIG. 5, during a first portion of a flight, indicated by the arrows A, B, and C, the aerostat 400 may tack at a first frequency. Subsequently, once the aerostat 400 is within a predetermined distance D from a desired location, a controller may cause the aerostat to increase its tacking frequency. For example, responsive to determining that the aerostat 400 is within a threshold distance of the desired location, the controller may cause the aerostat to transition to tacking at a second frequency that is greater than the first frequency. Furthermore, the controller may instruct the aerostat to gradually increase its tacking frequency over time, as the aerostat 400 approaches the desired location.

Figure 6:
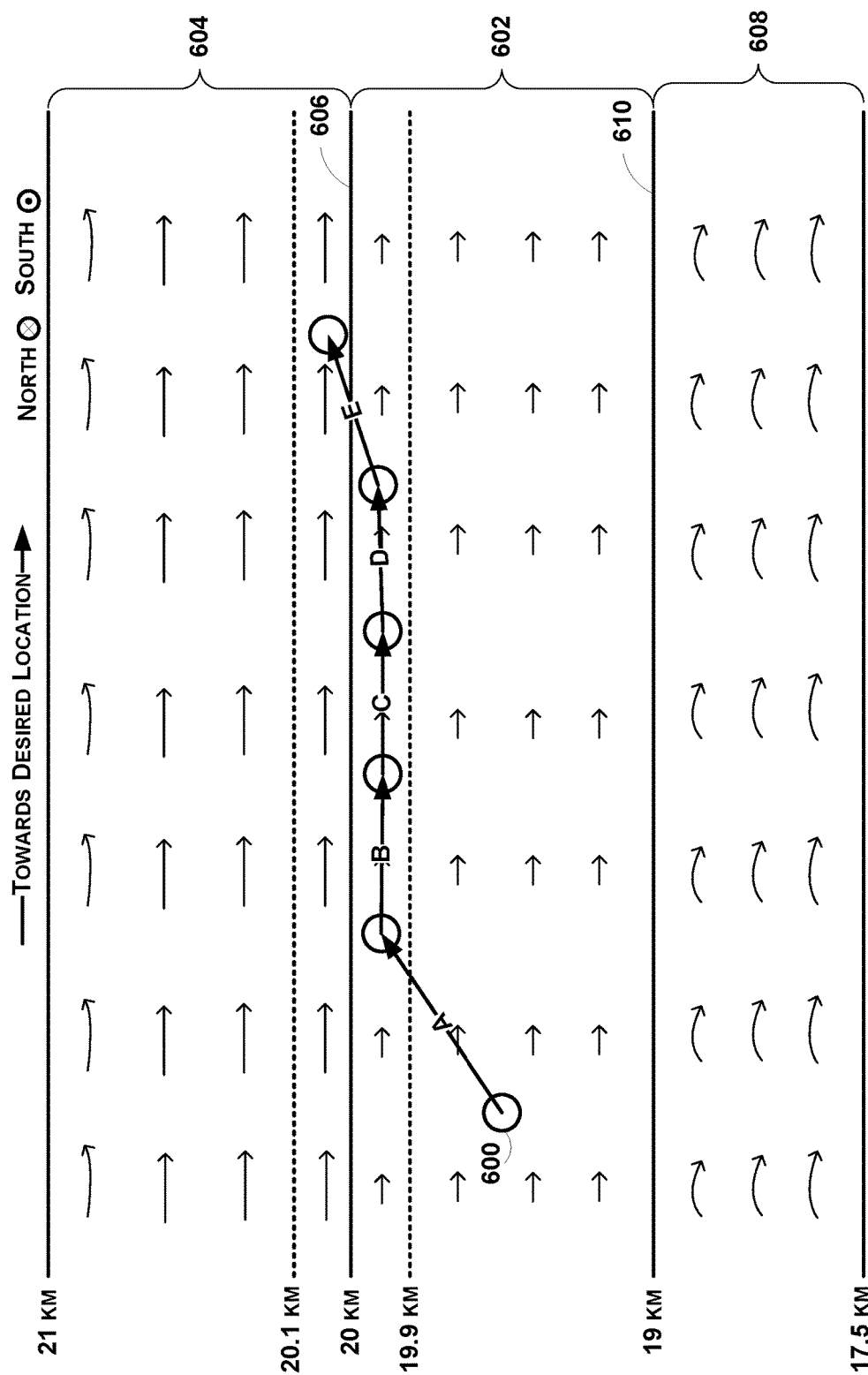
FIG. 6 is a conceptual illustration of another example flight path of an aerostat, according to an example embodiment.

FIG. 6 is a conceptual illustration of another example flight path of an aerostat, according to an example embodiment. As shown in FIG. 6, in some instances, an aerostat 600 may initially be located within a first atmospheric layer 602. Further, the first atmospheric layer 402 may be separated from a second atmospheric layer 604 by a first atmospheric layer boundary 606 and separated from a third atmospheric layer 608 by a second atmospheric layer boundary 610.

As indicated by the wind vectors in FIG. 6, the winds within the first atmospheric layer 602 and the second atmospheric layer 604 may have relatively similar directions but differing speeds. Further, the winds within the first atmospheric layer 602 may have different speeds and directions than the winds within the third atmospheric layer 608.

In one example, given the winds within the first atmospheric layer, second atmospheric layer, and third atmospheric layer as well as a desired horizontal trajectory for the aerostat (e.g., a horizontal trajectory towards the desired location), a controller may determine whether to position the aerostat 600 within a predetermined vertical distance from the first atmospheric layer boundary 606 or rather to position the aerostat 600 within the predetermined vertical distance from the second atmospheric layer boundary 610.

As depicted in FIG. 6, if, for example, the desired horizontal trajectory is similar to the direction of the winds in the first atmospheric layer 602 and the second atmospheric layer 604, the controller might elect to position the aerostat 600 near the first atmospheric layer boundary 606. In this manner, the aerostat would be located in a position from which the aerostat 600 can relatively inexpensively (in terms of power consumption) and quickly increase its speed by increasing its altitude and crossing the first atmospheric layer boundary 606 to catch the winds in the second atmospheric layer 604.

On the other hand, if the desired location is South of the initial location of the aerostat 600, the controller might elect to position the aerostat 600 near the second atmospheric layer boundary 610 (not shown). In this manner, the controller could then cause the aerostat to tack back and forth across the second atmospheric layer boundary 610 in order to achieve a Southeastern horizontal trajectory.

In practice, the decision of whether to position the aerostat 600 near the first atmospheric layer boundary 606 or the second atmospheric layer boundary 610 might also be influenced by other factors, such as the vertical distance from the initial position of the aerostat 600 to each of the atmospheric boundary layers and/or a desired altitude of the aerostat at the desired location, among other possible factors.

VI. Illustrative Methods

Figure 7:
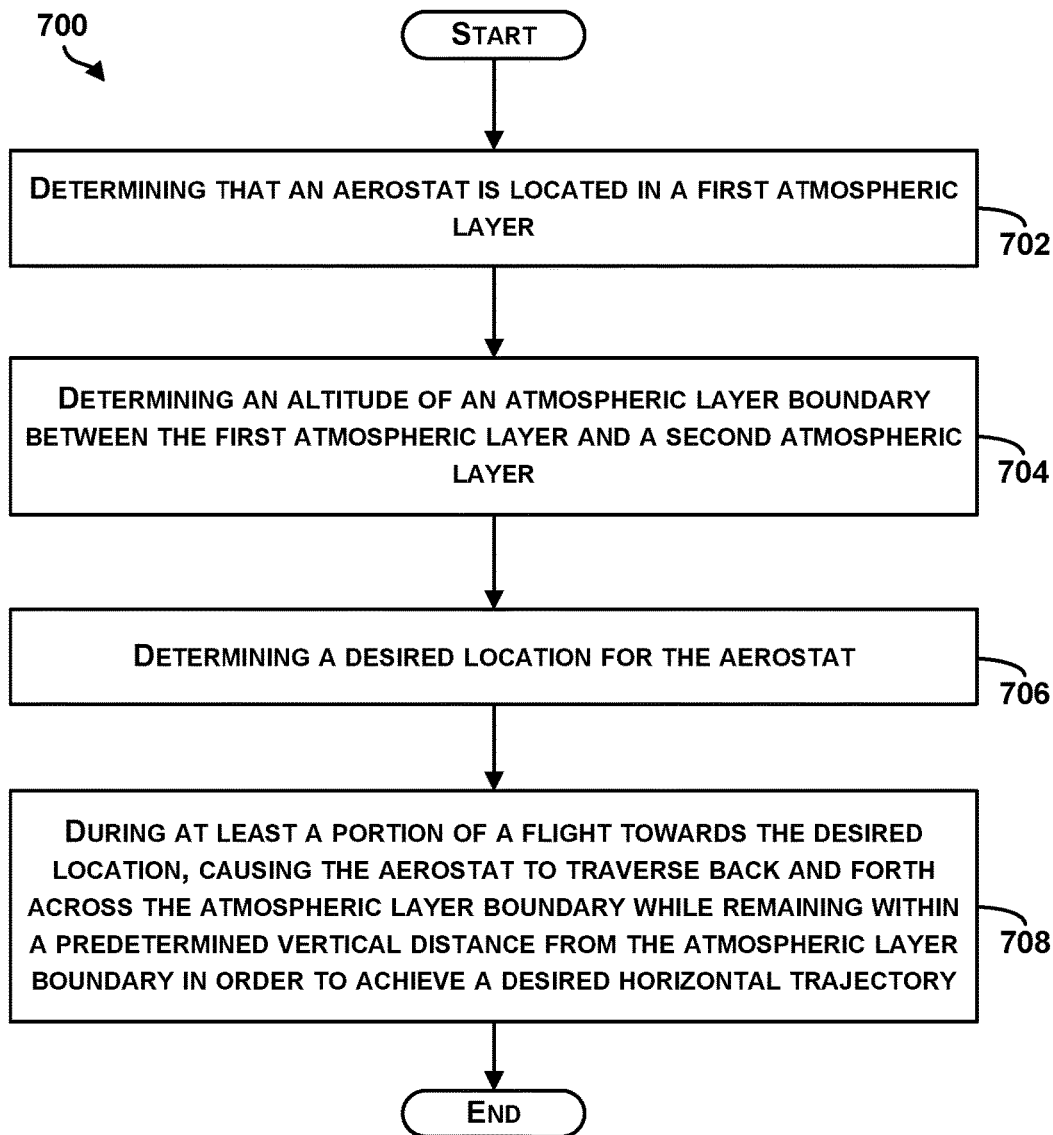
FIG. 7 is a block diagram of an example method for controlling an aerostat, in accordance with at least some embodiments described herein.

FIG. 7 is an example block diagram of a method 700 for controlling an aerostat, in accordance with at least some embodiments described herein. Method 700 shown in FIG. 7 presents an embodiment of a method that, for example, could be used with the balloon networks 100 and 204, for example, and may be performed by a device, a server, a control station, an aerostat (e.g., a balloon), or a combination of any components of the balloon networks 100 and 204. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 700 and other processes and methods disclosed herein, each block in FIG. 7 may represent circuitry that is wired to perform the specific logical functions in the process.

At block 702, the method 700 includes determining that an aerostat is located in a first atmospheric layer. At block 704, the method 700 includes determining an altitude of an atmospheric layer boundary between the first atmospheric layer and a second atmospheric layer. In line with the discussion above, a first wind-velocity measure may be indicative of wind velocity in the first atmospheric layer, and a second wind-velocity measure may be indicative of wind velocity in the second atmospheric layer. Further, the first wind-velocity measure and the second wind-velocity measure may differ by at least a threshold amount.

At block 706, the method 700 includes determining a desired location for the aerostat. And at block 708, the method 700 includes during at least a portion of a flight towards the desired location, causing the aerostat to traverse back and forth across the atmospheric layer boundary while remaining within a predetermined vertical distance from the atmospheric layer boundary in order to achieve a desired horizontal trajectory.

As noted above, in some examples, the method 700 may further include while the aerostat is traversing back and forth across the atmospheric layer boundary, controlling a respective amount of time spent on each side of the atmospheric layer boundary in order to achieve a desired horizontal trajectory.

In some examples, the method 700 or portions of the method 700 may be performed by a ground-based station (e.g., the ground-based station 112 in FIG. 1) or a central system (e.g., the central control system 200 in FIG. 2), and instructions can be provided to the aerostat. In other examples, the method 700 or portions of the method 700 may be performed by the aerostat, or by processors or computing devices residing on the aerostat, for example. The aerostat may receive any necessary information for performing the method 700 from a server or ground-based station or from other aerostats. In further examples, the method 700 may be performed by a combination of the aerostat and a ground-based station, and each may be in communication so as to perform functions of the method 700.

Figure 8:
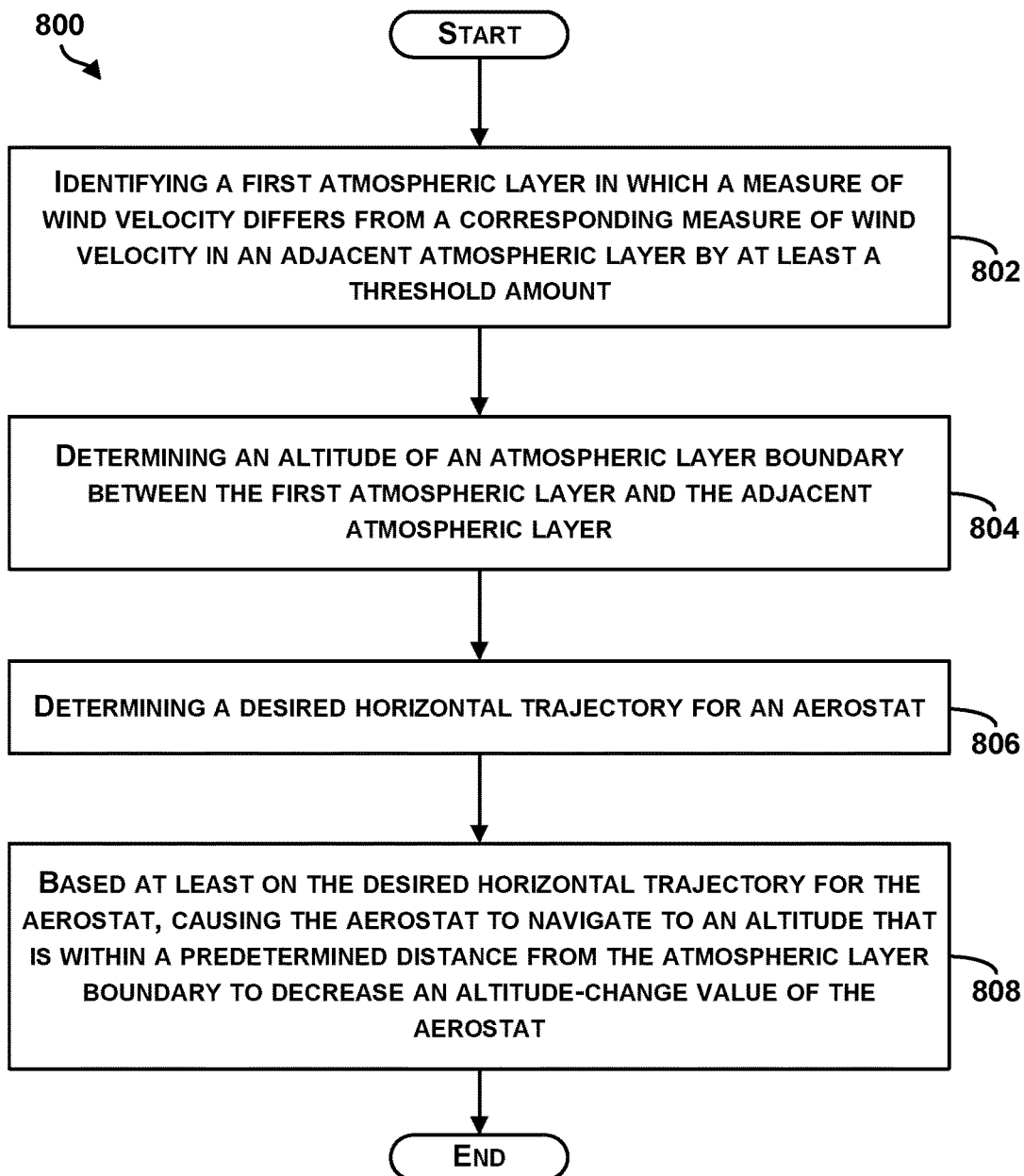
FIG. 8 is a block diagram of another example method for controlling an aerostat, in accordance with at least some embodiments described herein.

FIG. 8 is a block diagram of another example method for controlling an aerostat, in accordance with at least some embodiments described herein. Method 800 shown in FIG. 8 presents an embodiment of a method that, for example, could be used with the balloon networks 100 and 204, for example, and may be performed by a device, a server, a control station, an aerostat (e.g., a balloon), or a combination of any components of the balloon networks 100 and 204. Method 800 may include one or more operations, functions, or actions as illustrated by one or more of blocks 802-808. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, the method 800 includes identifying a first atmospheric layer in which a measure of wind velocity differs from a corresponding measure of wind velocity in an adjacent atmospheric layer by at least a threshold amount. At block 804, the method 800 includes determining an altitude of an atmospheric layer boundary between the first atmospheric layer and the adjacent atmospheric layer. As discussed above, in some examples, an aerostat may search vertically for the atmospheric layers and the atmospheric layer boundary, evaluating wind conditions at various altitudes. Alternatively, a controller may identify the atmospheric layers and the atmospheric layer boundary by analyzing wind data received from the aerostat and/or one or more other aerostats.

At block 806, the method 800 includes determining a desired horizontal trajectory for an aerostat. As discussed above, the desired horizontal trajectory may be determined based on an initial location of the aerostat and a desired location of the aerostat. And at block 808, the method 800 includes based at least on the desired horizontal trajectory for the aerostat, causing the aerostat to navigate to an altitude that is within a predetermined vertical distance from the atmospheric layer boundary to decrease an altitude-change value of the aerostat. In line with the discussion above, the altitude-change value may be indicative of a minimum altitude change required by the aerostat in order to change its horizontal velocity by a predetermined amount. The minimum altitude change may be a minimum altitude change from the current altitude of the aerostat.

In some examples, the method 800 or portions of the method 800 may be performed by a ground-based station (e.g., the ground-based station 112 in FIG. 1) or a central system (e.g., the central control system 200 in FIG. 2), and instructions can be provided to the aerostat. In other examples, the method 800 or portions of the method 800 may be performed by the aerostat, or by processors or computing devices residing on the aerostat, for example. The aerostat may receive any necessary information for performing the method 800 from a server or ground-based station or from other aerostats. In further examples, the method 800 may be performed by a combination of the aerostat and a ground-based station, and each may be in communication so as to perform functions of the method 800.

As discussed above, in some examples, a fleet plan that stages aerostats in particular places ahead of deadlines such that the aerostats will be able to arrive at a desired location on time may be required. Given the advantages of navigating within a predetermined distance of an atmospheric layer boundary, in some instances, an aerostat's proximity to an atmospheric layer boundary during a path could be integrated as a factor in a flight planning model for a fleet.

By way of example, when managing a fleet of autonomous aerostats, a fleet administrator or computer may determine a sequence of coverage requirements for the fleet. The sequence of coverage requirements may specify desired amounts of aerostat coverage for different parts of the world. For instance, the desired amounts of aerostat coverage may include providing at least ten aerostats in a first area, at least five aerostats in a second area, and at least eighteen aerostats in a third area at a first instance in time and then, at a second instance in time, providing at least five aerostats in the first area, ten aerostats in the second area, and twenty aerostats in the third area. In order for a fleet of aerostats to satisfy the coverage requirements, a fleet plan that stages aerostats in particular places ahead of deadlines such that the aerostats will be able to arrive at a desired location on time may be required. Therefore, to control the fleet of aerostats, a simultaneous plan of trajectory for many aerostats at many different starting locations is needed, and each aerostat may take a different path.

Given the initial position of one or more aerostats of a fleet of aerostats and a sequence of coverage requirements, a flight planning model may determine trajectories for each aerostat of the fleet that satisfy the sequence of requirements. According to an example method, initial positions of each aerostat of a fleet of aerostats as well as a sequence of coverage requirements may be received or determined. The coverage requirements may be goal distributions for the fleet that are defined with respect to various landmarks of a region of interest. For example, the region of interest may include a small region of the Earth or possibly the entire Earth, and the landmarks may be individual locations, positions, or subregions within the region of interest. In one example, the coverage requirements may specify a desired number of aerostats, or goal, for each landmark at various times within a planning period of time. The desired number of aerostats is but one objective function on the aerostat distribution. In other examples, the coverage requirement may be specified in another form. Thus the coverage requirements may be specified according to any objective function on the aerostat distribution among the region of interest.

Additionally, the period of time may then be divided into a plurality of phases. For instance each phase may correspond to a time interval within the period of time. Within each phase, a summary of which landmarks are reachable by an aerostat from which other landmarks may be determined based on predicted wind conditions for the region of interest. For example, for each phase and respective landmark, a set of starting landmarks from which a aerostat could reach the respective landmark by following one or more predicted winds at one or more altitudes during the phase may be found.

Given the summary of which landmarks are reachable from other landmarks during each phase as well as the goal number of aerostats for each landmark at the end of each phase, a determination regarding which landmark that each aerostat should travel to during each phase may be made. For instance, trajectories for each aerostat that satisfy the sequence of coverage requirements may be determined by solving an optimization problem.

In one example, trajectories that minimize the number of unsatisfied goals may be found by minimizing a linear objective function. The linear objective function may penalize fleet plans that put less than a minimum of aerostats at some landmark; for each aerostat fewer than desired, the penalty may go up. The optimal plan therefore, may be the plan that minimizes the objective function. An additional term can also be included that minimizes a measure of cost for each trajectory. The cost may be a cost-in-power, for instance. In another example, the trajectories may be determined using a minimum-cost-flow approach. Other optimization methods that directly or approximately solve for the trajectories of the fleet may also be used.

The proximity of an aerostat to an atmospheric layer boundary may be integrated into the trajectory-determining process in various ways. In one approach, when determining which landmarks are reachable from an aerostat from which other landmarks, a cost-in-power for each path between two landmarks may be computed. The cost in power may be indicative of an amount of power necessary to adjust an altitude of the aerostat to reach one or more altitudes during the path. Further, when determining the cost in power, the aerostat may be modeled as executing a tacking technique or altitude-change value minimization technique, such as any of the techniques discussed above. This assumption may, for example, make power estimates more accurate, improving the assessment of the viability of each considered path and/or quality of each considered path. For instance, a filtering heuristic may be applied to refine the possible routes between landmarks during a phase. The filtering heuristic may include as viable routes any paths that have a cost-in-power that is below a threshold cost-in-power but reject as viable routes any paths having a cost-in-power that is above the threshold cost-in-power.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
   determining that an aerostat is located within a first atmospheric layer, wherein a first wind-velocity measure is indicative of wind velocity in the first atmospheric layer,
   determining an altitude of an atmospheric layer boundary between the first atmospheric layer and a second atmospheric layer, wherein a second wind-velocity measure is indicative of wind velocity in the second atmospheric layer, and wherein the second wind-velocity measure differs from the first wind-velocity measure by at least a threshold amount;
   determining a desired location for the aerostat; and
   during at least a portion of a flight towards the desired location, causing, by a controller, the aerostat to traverse back and forth across the atmospheric layer boundary while remaining within a predetermined vertical distance from the atmospheric layer boundary in order to achieve a desired horizontal trajectory.

2. The computer-implemented method of claim 1, further comprising:
   determining that an initial altitude of the aerostat is outside the predetermined vertical distance from the atmospheric layer boundary; and
   responsive to determining that the initial altitude of the aerostat is outside the predetermined vertical distance from the atmospheric layer boundary, positioning the aerostat at an altitude within the predetermined vertical distance from the atmospheric layer boundary.

3. The computer-implemented method of claim 1, further comprising:

determining, based on an initial location of the aerostat and the desired location for the aerostat, the desired horizontal trajectory for the aerostat; and while the aerostat is traversing back and forth across the atmospheric layer boundary, controlling a respective amount of time spent on each side of the atmospheric layer boundary in order to achieve the desired horizontal trajectory.

4. The computer-implemented method of claim 3:

wherein the first wind-velocity measure is indicative of wind velocity in the first atmospheric layer within the predetermined vertical distance from the atmospheric layer boundary, wherein the second wind-velocity measure is indicative of wind velocity in the second atmospheric layer within the predetermined vertical distance from the atmospheric layer boundary, and wherein controlling the respective amount of time spent on each side of the atmospheric layer boundary in order to achieve the desired trajectory comprises, based on the first wind-velocity measure and the second wind-velocity measure, causing the aerostat to operate within the first atmospheric layer for a first percentage of a time period and operate within the second atmospheric layer for a second percentage of the time period in order to achieve the desired horizontal trajectory.

5. The computer-implemented method of claim 1, wherein causing the aerostat to traverse back and forth across the atmospheric layer boundary while remaining within the predetermined vertical distance of the atmospheric layer boundary in order to achieve the desired horizontal trajectory comprises:

initially causing the aerostat to traverse back and forth across the atmospheric layer boundary at a first frequency, wherein the first frequency comprises a first number of atmospheric layer boundary crossings per unit time; and subsequently causing the aerostat to transition to traversing back and forth across the atmospheric layer boundary at a second frequency, wherein the second frequency comprises a second number of atmospheric layer boundary crossing per unit time that is greater than the first number.

6. The computer-implemented method of claim 5, further comprising:

determining that the aerostat is within a threshold distance of the desired location; and responsive to determining that the aerostat is within the threshold distance of the desired location, causing the aerostat to transition to traversing back and forth across the atmospheric layer boundary at the second frequency.

7. The computer-implemented method of claim 1, wherein the atmospheric layer boundary comprises a stratospheric layer boundary.

8. The computer-implemented method of claim 1, further comprising determining the location of the atmospheric layer boundary based on wind-velocity data received from one or more other aerostats.

9. The computer-implemented method of claim 1, further comprising:

determining an altitude of another atmospheric layer boundary between the first atmospheric layer and a third atmospheric layer, wherein a third wind-velocity measure is indicative of wind velocity in the third atmospheric layer, and wherein the third wind-velocity measure differs from the first wind-velocity measure by at least the threshold amount; and based at least on the first, second, and third wind-velocity measures and the desired horizontal trajectory, positioning the aerostat at an altitude within the predetermined vertical distance from the atmospheric layer boundary rather than positioning the aerostat at an altitude within the predetermined vertical distance from the another atmospheric layer boundary.

10. A computing device comprising:

a processor; and a non-transitory computer-readable medium having stored therein instructions that are executable to cause the computing device to perform functions comprising:

determining that an aerostat is located within a first atmospheric layer, wherein a first wind-velocity measure is indicative of wind velocity in the first atmospheric layer, determining an altitude of an atmospheric layer boundary between the first atmospheric layer and a second atmospheric layer, wherein a second wind-velocity measure is indicative of wind velocity in the second atmospheric layer, and wherein the second wind-velocity measure differs from the first wind-velocity measure by at least a threshold amount, determining a desired location for the aerostat, and during at least a portion of a flight towards the desired location, causing the aerostat to traverse back and forth across the atmospheric layer boundary while remaining within a predetermined vertical distance of the atmospheric layer boundary in order to achieve a desired horizontal trajectory.

11. The computing device of claim 10, wherein the functions further comprise:

determining, based on an initial location of the aerostat and the desired location for the aerostat, the desired horizontal trajectory for the aerostat; and while the aerostat is traversing back and forth across the atmospheric layer boundary, controlling a respective amount of time spent on each side of the atmospheric layer boundary in order to achieve the desired horizontal trajectory.

12. The computing device of claim 11:

wherein the first wind-velocity measure is indicative of wind velocity in the first atmospheric layer within the predetermined vertical distance from the atmospheric layer boundary, wherein the second wind-velocity measure is indicative of wind velocity in the second atmospheric layer within the predetermined vertical distance from the atmospheric layer boundary, and wherein controlling the respective amount of time spent on each side of the atmospheric layer boundary in order to achieve the desired trajectory comprises, based on the first wind-velocity measure and the second wind-velocity measure, causing the aerostat to operate within the first atmospheric layer for a first percentage of a time period and operate within the second atmospheric layer for a second percentage of the time period in order to achieve the desired horizontal trajectory.

13. The computing device of claim 10, wherein causing the aerostat to traverse back and forth across the atmospheric layer boundary while remaining within the predetermined vertical distance of the atmospheric layer boundary in order to achieve the desired horizontal trajectory comprises:

initially causing the aerostat to traverse back and forth across the atmospheric layer boundary at a first frequency, wherein the first frequency comprises a first number of atmospheric layer boundary crossings per unit time; and subsequently causing the aerostat to transition to traversing back and forth across the atmospheric layer boundary at a second frequency, wherein the second frequency comprises a second number of atmospheric layer boundary crossing per unit time that is greater than the first number.

14. The computing device of claim 10, wherein the functions further comprise:

determining that the aerostat is within a threshold distance of the desired location; and responsive to determining that the aerostat is within the threshold distance of the desired location, causing the aerostat to transition to traversing back and forth across the atmospheric layer boundary at the second frequency.

15. The computing device of claim 10, wherein the atmospheric layer boundary comprises a stratospheric layer boundary.

\* \* \* \* \*